US007712646B2

(12) United States Patent
Gamble et al.

(10) Patent No.: US 7,712,646 B2
(45) Date of Patent: May 11, 2010

(54) ADAPTOR FOR A TOOL

(75) Inventors: Tim Gamble, Viewbank (AU); Andrew Crawford, Hoppers Crossing (AU); Fred Blochlinger, Mt. Eliza (AU)

(73) Assignee: Cetram Pty Limited, Victoria (AU)

( * ) Notice: Subject to any disclaimer, the term of this patent is extended or adjusted under 35 U.S.C. 154(b) by 337 days.

(21) Appl. No.: 10/599,712

(22) PCT Filed: Apr. 6, 2005

(86) PCT No.: PCT/IB2005/000888

§ 371 (c)(1), (2), (4) Date: Jul. 23, 2007

(87) PCT Pub. No.: WO2005/099060

PCT Pub. Date: Oct. 20, 2005

(65) Prior Publication Data

US 2008/0041192 A1 Feb. 21, 2008

(30) Foreign Application Priority Data

Apr. 6, 2004 (AU) .............................. 2004901855
May 24, 2004 (AU) .............................. 2004902763

(51) Int. Cl.
*H02G 3/32* (2006.01)
*B25C 7/00* (2006.01)

(52) U.S. Cl. ........................... 227/29; 227/30; 227/110; 227/113; 227/119; 227/124

(58) Field of Classification Search ................... 227/29, 227/30, 110, 113, 119, 124
See application file for complete search history.

(56) References Cited

U.S. PATENT DOCUMENTS 3,854,536 A * 12/1974 Hallock, Jr. .................. 173/15
3,998,372 A 12/1976 Leonardo et al.
4,128,043 A * 12/1978 Grassl ........................ 409/232
4,451,810 A * 5/1984 Miller ........................ 335/285
4,514,117 A * 4/1985 Scott ...................... 408/239 R
4,591,817 A * 5/1986 Miller ........................ 335/285

(Continued)

FOREIGN PATENT DOCUMENTS

JP 3-10207 U 1/1991

*Primary Examiner*—Brian D Nash
(74) *Attorney, Agent, or Firm*—Lowe Hauptman Ham & Berner LLP

(57) ABSTRACT

An adaptor (10) for a fastening tool (12) having an attachment portion (18) for coupling the adaptor (10) to the fastening tool and a support (14, 16) for coupling a mounting bracket (26) to the adaptor (10), arranged so as to hold the mounting bracket (26) relative to a substrate and allow a fastener from the tool to be driven through the mounting bracket to secure the mounting bracket to the substrate (52). A holder for holding an item to facilitate attachment of said item to a substrate by a fastener, wherein the holder magnetically retains the item in a position to receive the fastener from a fastener tool. A method of securing a mounting bracket to a substrate including the steps of coupling the mounting bracket (26) to an adaptor (10) which is arranged so as to hold the mounting bracket relative to a fastening tool (12), supporting the mounting bracket in position relative to the substrate (52), and operating the tool to drive a fastener through a mounting portion of the mounting bracket to secure the mounting bracket to the substrate.

23 Claims, 14 Drawing Sheets

U.S. PATENT DOCUMENTS

| | | | | |
|---|---|---|---|---|
| 4,684,050 | A | 8/1987 | Masas et al. | |
| 4,829,855 | A * | 5/1989 | Martinez | 81/44 |
| 4,934,717 | A * | 6/1990 | Budelman et al. | 279/79 |
| 5,129,118 | A * | 7/1992 | Walmesley | 7/158 |
| 5,484,094 | A | 1/1996 | Gupta et al. | |
| 5,638,726 | A * | 6/1997 | Pelkonen et al. | 81/57.43 |
| 5,683,024 | A * | 11/1997 | Eminger et al. | 227/8 |
| 6,007,277 | A * | 12/1999 | Olson et al. | 408/35 |
| 6,164,168 | A * | 12/2000 | Anderson | 81/125 |
| 6,296,064 | B1 * | 10/2001 | Janusz et al. | 173/30 |
| 6,302,409 | B1 * | 10/2001 | Gutsche | 279/128 |
| 6,729,522 | B2 * | 5/2004 | Hempfling et al. | 227/119 |

* cited by examiner

ADAPTOR FOR A TOOL

RELATED APPLICATIONS

The present application is a National Phase entry of International Application Number PCT/IB2005/000888, filed Apr. 6, 2005, which claims priority from, Australian Application Numbers 2004901855, filed Apr. 6, 2004 and 2004902763, filed May 24, 2004, the disclosures of which are hereby incorporated by reference herein in their entirety.

FIELD OF THE INVENTION

This invention relates to an adaptor for a tool and more particularly, but not exclusively, to an adaptor for a fastening tool to facilitate attachment of a bracket or other item to a substrate.

BACKGROUND OF THE INVENTION

It has been previously proposed to house electrical wires within a conduit in the form of a plastic tube or piping for running the wires between locations. For example, electrical wires conducting mains electricity may be run along the outside wall of a building between power points and/or fixed electrical fittings in this way. The wires are commonly sheathed within PVC piping or some other form of conduit to protect and insulate the wires. The conduit is commonly mounted to a substrate by mounting brackets fastened to the substrate at spaced intervals. Mounting brackets used for this purpose typically have a holding portion and a mounting portion integrally attached to the holding portion. The holding portion is shaped such that, in use, the holding portion extends around the conduit so as to hold the conduit in place between the mounting bracket and the substrate. The mounting portion is provided with an aperture through which a fastener can be inserted so as to fasten the mounting bracket to the substrate. The fastener may be in the form of, for example, a nail, bolt or screw. When the fastener is in the form of a screw, an anchor (for example a plastic anchor) may be used to assist in retaining the screw within the wall, particularly in the case where the wall is of a material (Such as brick, concrete or plaster) susceptible to failure when an axial load is applied to the screw.

Typically, mounting brackets of the above type are installed by manually supporting the mounting bracket over the conduit with the holding portion of the mounting bracket extending around an outside surface of the conduit so as to locate the conduit and mounting bracket in position ready for fastening. The fastener is then inserted through the aperture of the mounting bracket and into the substrate behind the mounting bracket, thus fastening the mounting bracket to the substrate. It is dangerous to use a powered fastening tool, such as a gas-actuated or powder-actuated fastening tool, to fasten mounting brackets in this way as, with the mounting bracket being supported manually in position during driving of the fastener through the mounting bracket, there exists a risk of accidentally driving a fastener through the hand used to support the mounting bracket in place. It is safer to manually insert a fastener through the aperture in the mounting bracket such as by manually driving a screw through the aperture and into the substrate of the wall using a screwdriver, however such manual insertion of fasteners is slow. Moreover, the fastening of mounting brackets in this way commonly requires two people, a first person to hold the mounting bracket and conduit in place and a second person to insert the fastener, making the process time-consuming and labour-intensive.

Examples of the present invention seek to overcome or at least alleviate one or more disadvantages of conventional methods of fastening wires housed in a conduit to a substrate.

SUMMARY OF THE INVENTION

In accordance with another aspect of the present invention there is provided an adaptor for a fastening tool having an attachment portion for coupling the adaptor to the fastening tool and a support for coupling a mounting bracket to the adaptor, arranged so as to hold the mounting bracket relative to a substrate and allow a fastener from the tool to be driven through the mounting bracket to secure the mounting bracket to the substrate.

Preferably, the attachment portion is fitted to a nosepiece of the tool. More preferably, the attachment portion includes an aperture which receives the nosepiece of the tool. More preferably, the adaptor is provided with a lock for releasably locking the adaptor to the nosepiece of the tool. Preferably, the lock is selectively operable to engage with an annular groove formed in an outer surface of the nosepiece.

Preferably, the adaptor is arranged to align an aperture of the mounting bracket with a nosepiece bore of the tool.

Preferably, the adaptor has a plurality of supports. More preferably, the supports are configured differently so as to be suitable for use with different mounting brackets. More preferably, the adaptor has a plurality of differently-sized supports which are suitable for use with differently-sized mounting brackets.

In a preferred form, the adaptor has a body which includes the attachment portion and the lock, and a pair of supports extending outwardly from opposite sides of the body, each of the supports being in the form of a curved arm having a different radius of curvature to enable contact between one of the arms and associated differently shaped mounting brackets.

Preferably, each support has a magnetic member for magnetic attraction with the mounting bracket so that the mounting bracket is able to be carried by the adaptor.

Preferably, the mounting bracket is for securing a conduit housing wires to a substrate.

In accordance with one aspect of the present invention there is provided an adaptor for a tool having an attachment portion for coupling to the tool, and a magnetic holder for holding a work piece with which the tool is arranged to operate.

Preferably, the adaptor is arranged to assist positioning of the work piece relative to the tool.

Preferably, the attachment portion includes a structure to engage with a nosepiece of the tool. Preferably, the structure has an aperture which receives the nosepiece of the tool. More preferably, the adaptor is provided with a lock for releasably locking the adaptor to the nosepiece of the tool. Preferably, the lock is selectively operable to engage with an annular groove formed in an outer surface of the nosepiece.

In accordance with another aspect of the present invention there is provided a method of securing a mounting bracket to a substrate including the steps of:

coupling the mounting bracket to an adaptor which is arranged so as to hold the mounting bracket relative to a fastening tool;

supporting the mounting bracket in position relative to the substrate; and operating the tool to drive a fastener through a mounting portion of the mounting bracket to secure the mounting bracket to the substrate.

Preferably, the method includes the step of coupling the adaptor to the fastening tool prior to the step of supporting the mounting bracket in position relative to the substrate.

Preferably, the method includes the step of uncoupling the adaptor from the secured mounting bracket.

Preferably, where the mounting bracket has two mounting portions, one at either side of a holding portion, after the step of operating the tool to drive a fastener through a mounting portion of the mounting bracket to secure the mounting bracket to the substrate, the method further includes the steps of:

pivoting the adaptor about substantially 180 degrees relative to the mounting bracket so as to align the tool for driving a second fastener through the other mounting portion of the mounting bracket; and operating the tool to drive the second fastener through the other mounting portion to further secure the mounting bracket to the substrate.

BRIEF DESCRIPTION OF THE DRAWINGS

The invention will now be described, by way of non-limiting example only, with reference to the accompanying drawings, in which.

DETAILED DESCRIPTION

Figure 1:
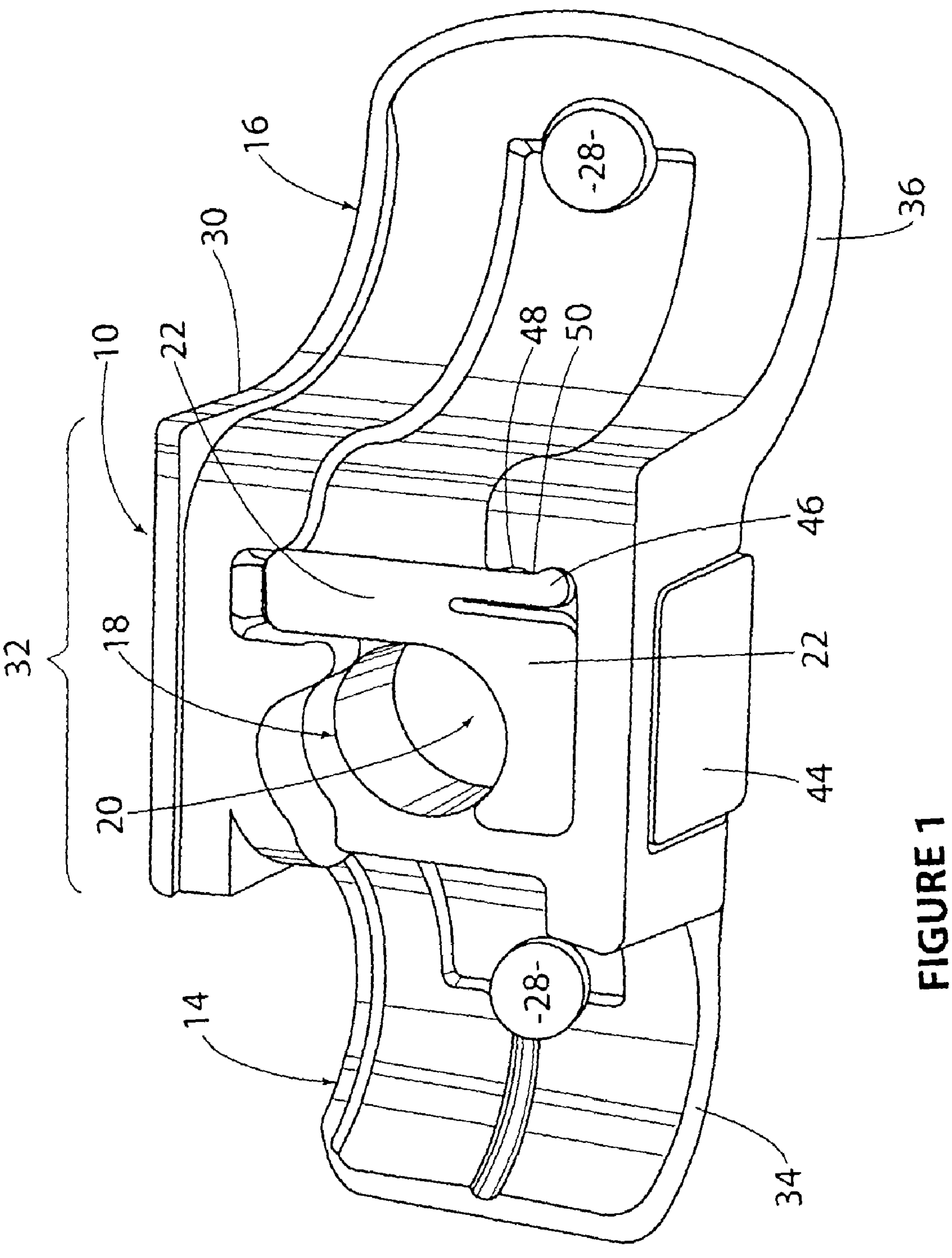
FIG. 1 is a bottom perspective view of an adaptor for a fastening tool.
Figure 8:
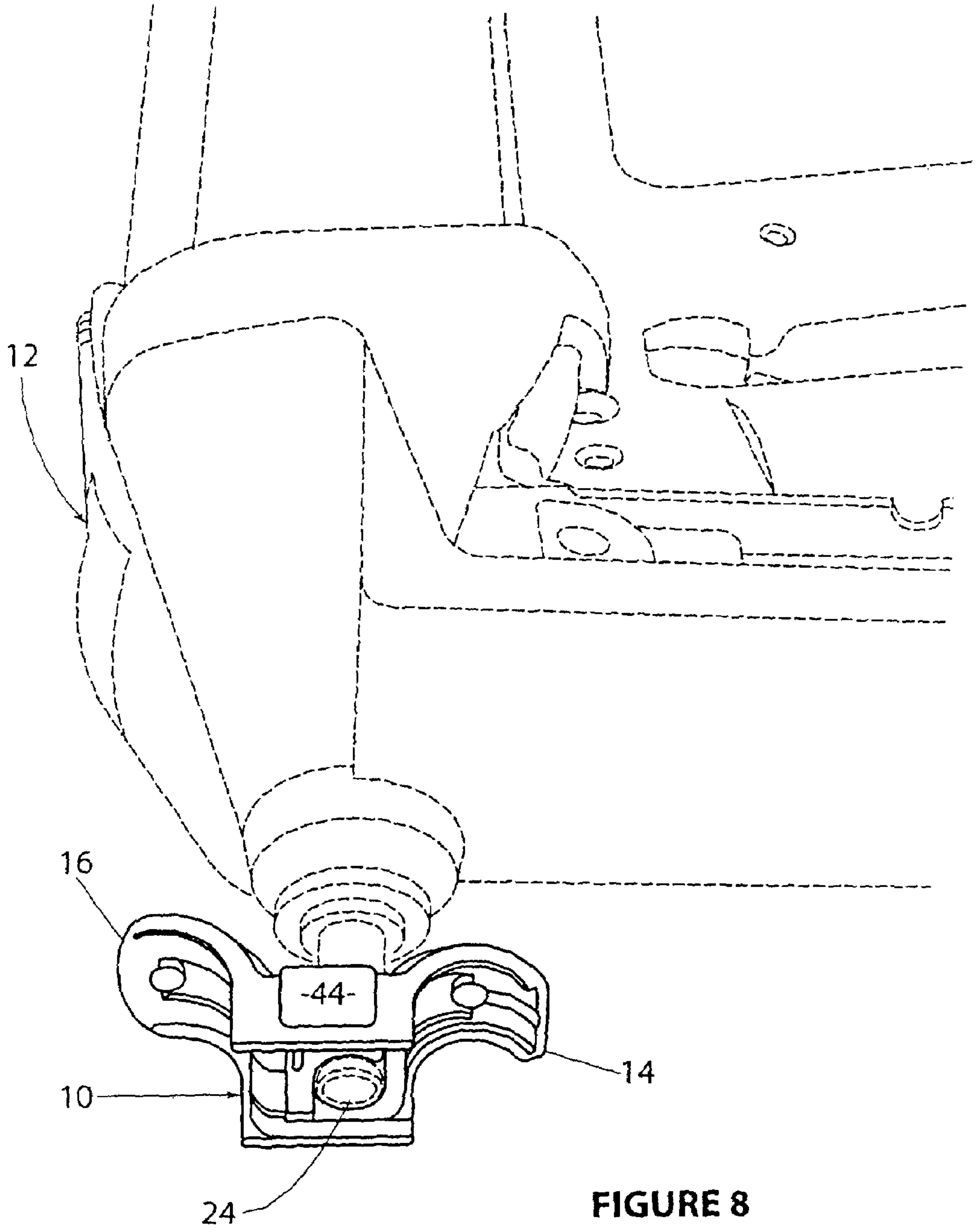
FIG. 8 is perspective view of the adaptor shown in FIGS. 1 to 7, the adaptor shown as being coupled to a fastening tool.
Figure 9:
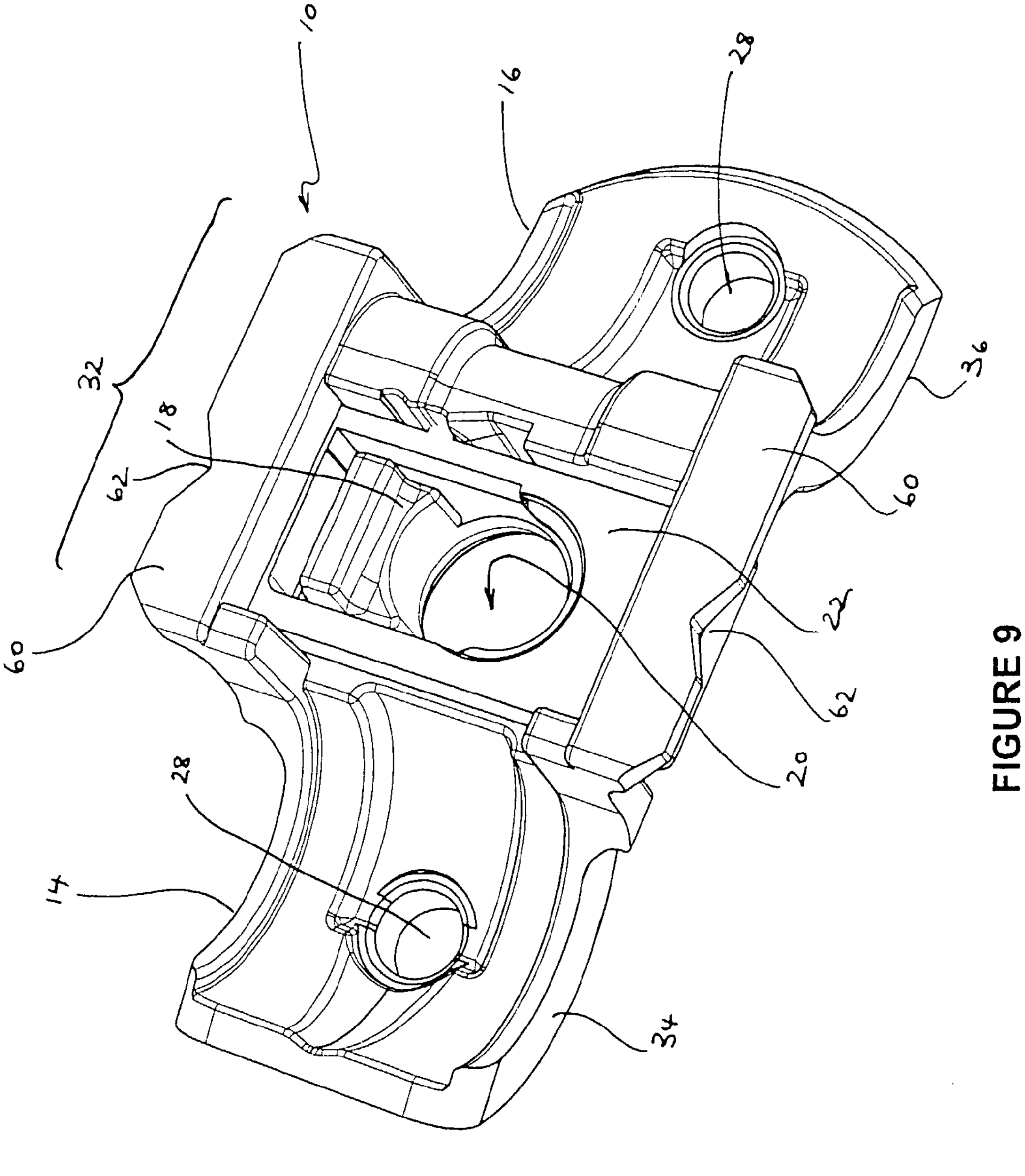
FIG. 9 is a bottom perspective view of an alternative adaptor for a fastening tool.
Figure 10:
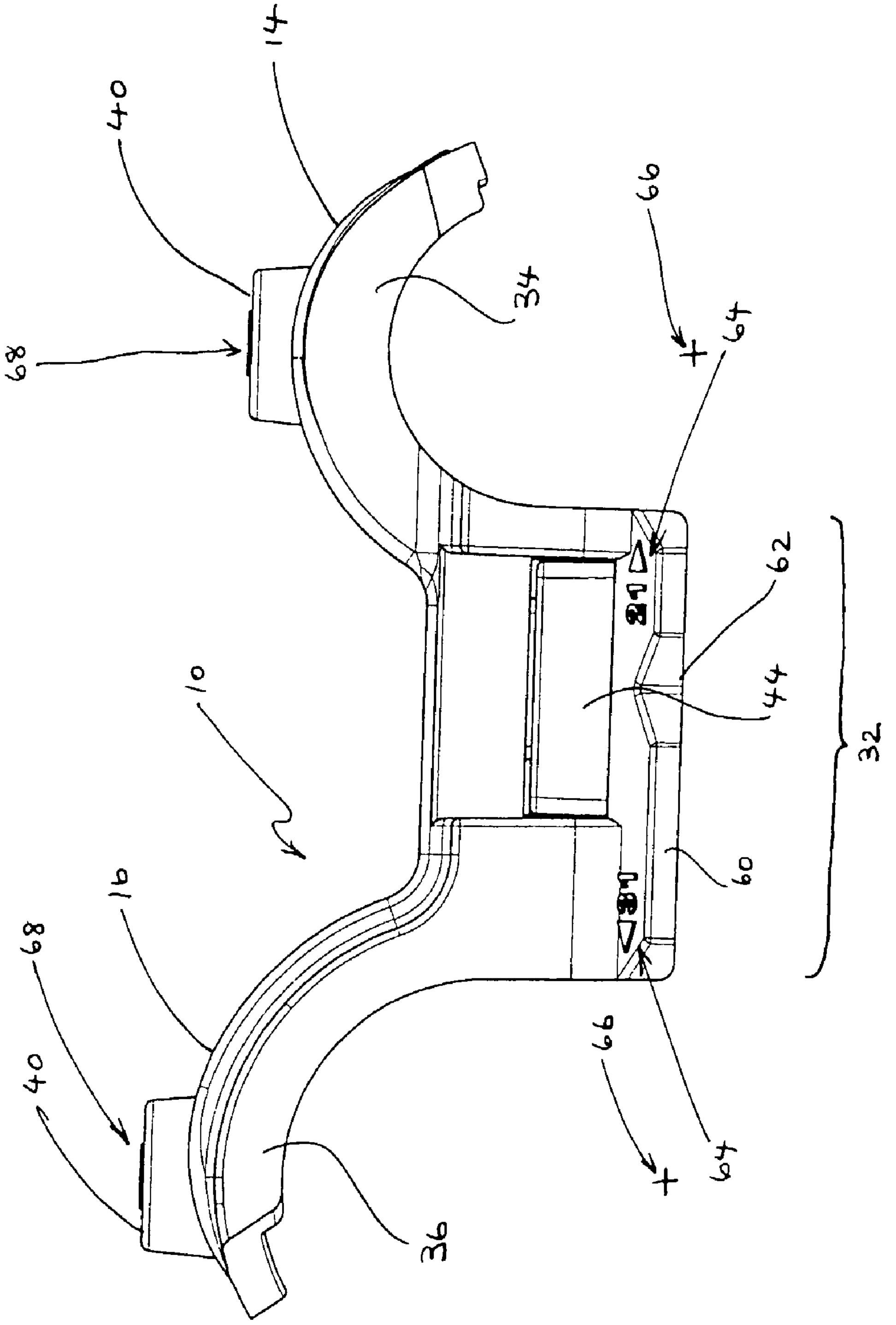
FIG. 10 is a side view of a side of the adaptor shown in FIG. 9.
Figure 11:
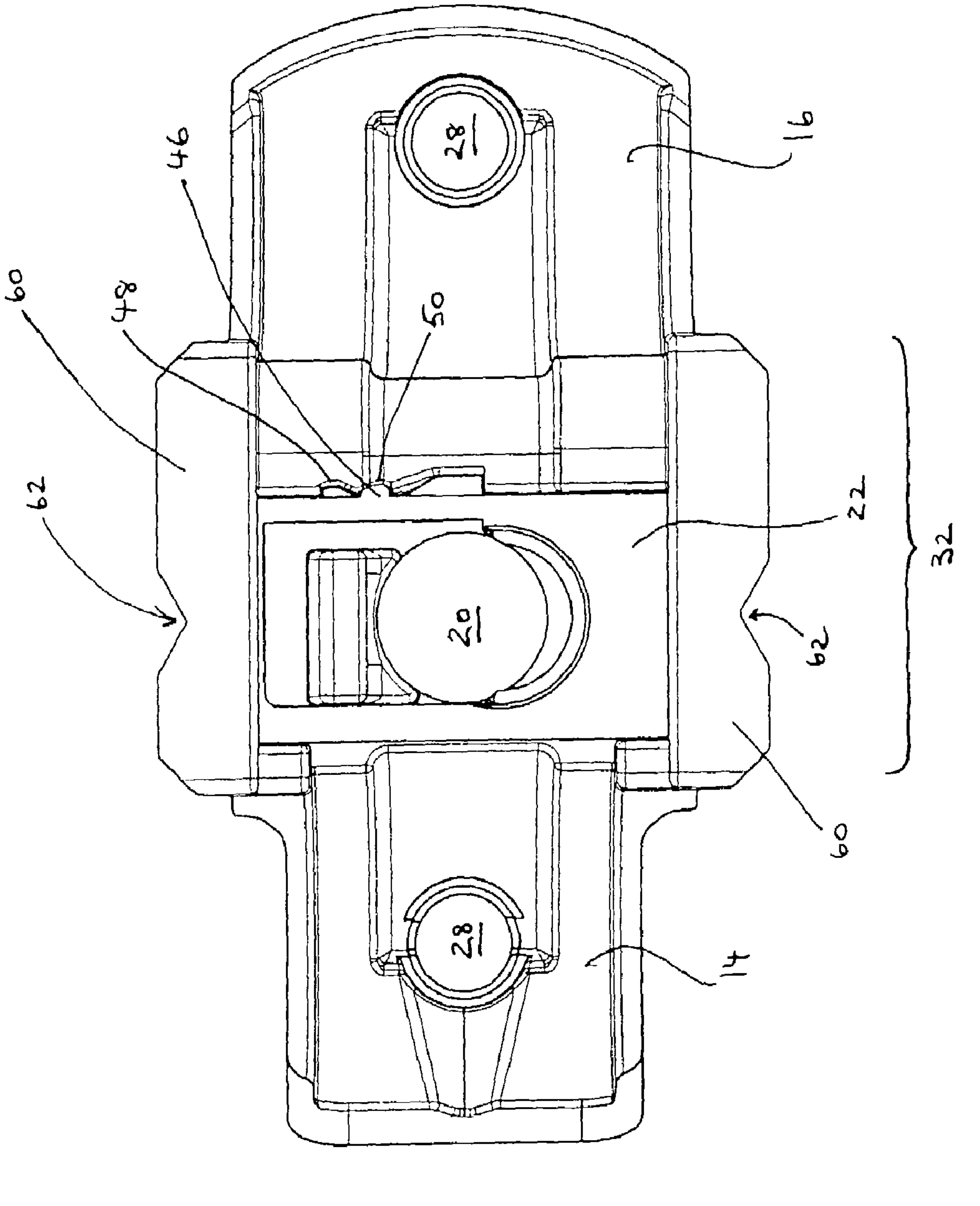
FIG. 11 is a bottom view of the adaptor shown in FIGS. 9 and 10.
Figure 12:
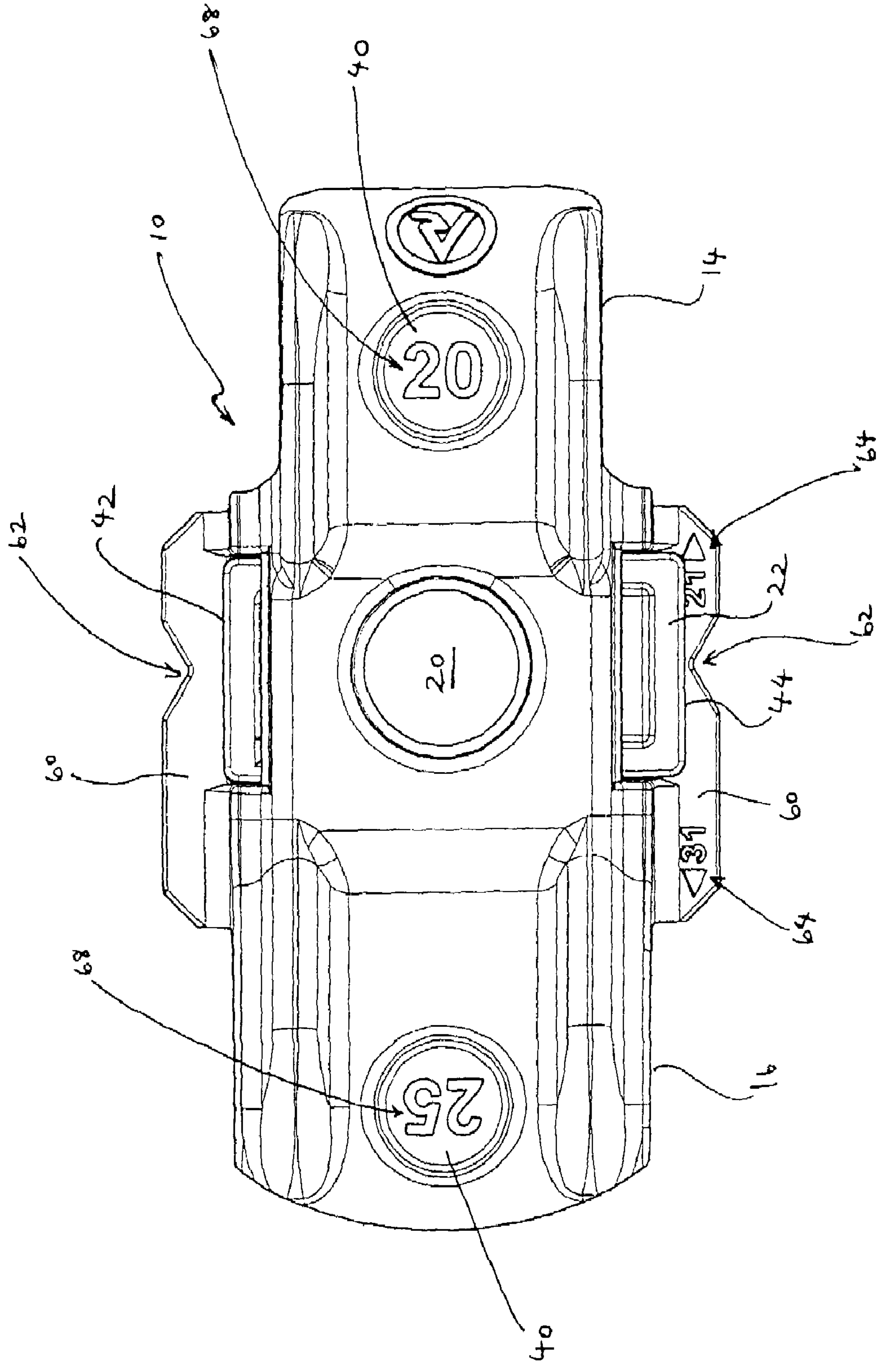
FIG. 12 is a top view of the adaptor shown in FIGS. 9 to 11.
Figure 13:
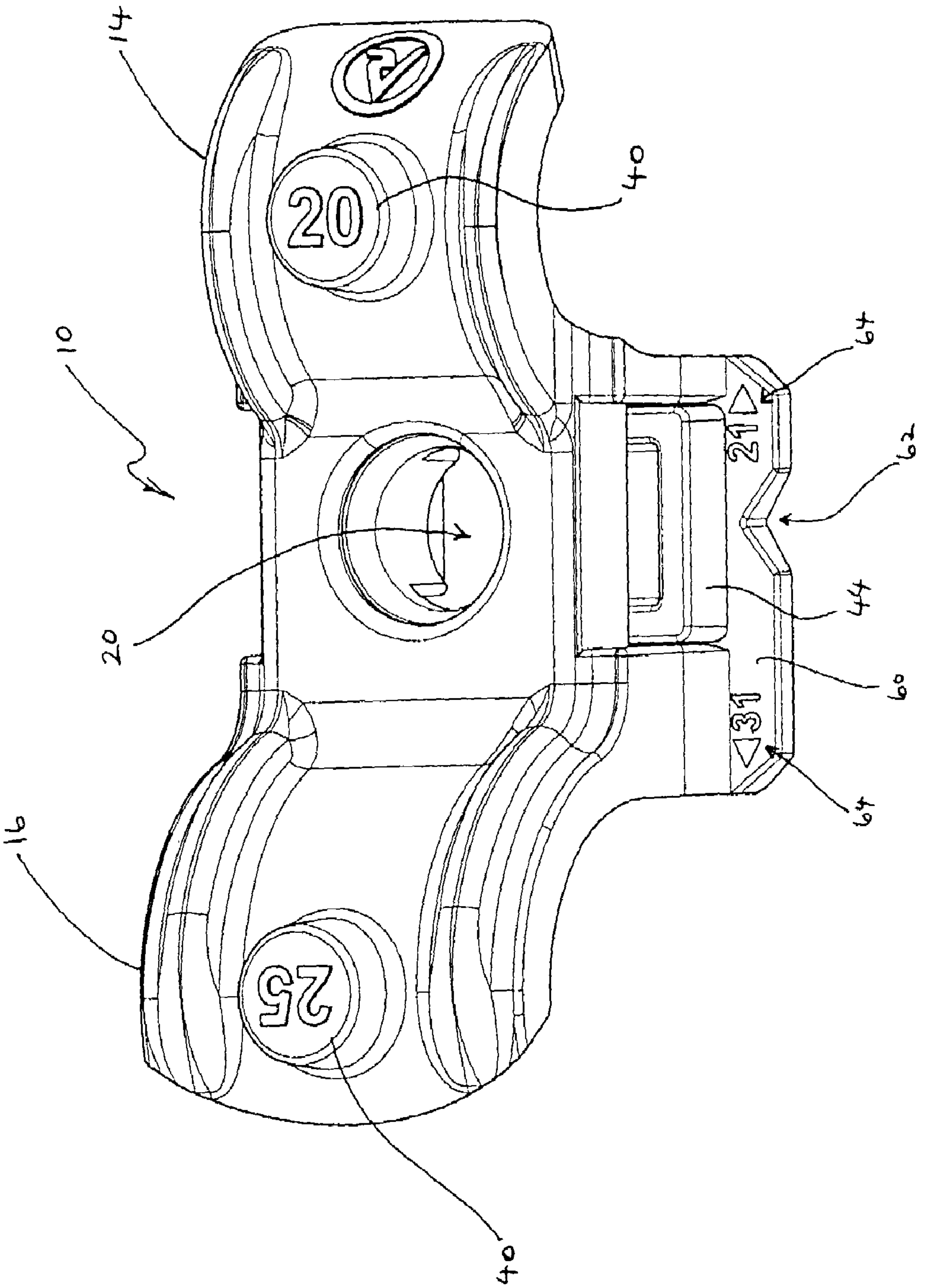
FIG. 13 is a side perspective view of the adaptor shown in FIGS. 9 to 12.
Figure 14:
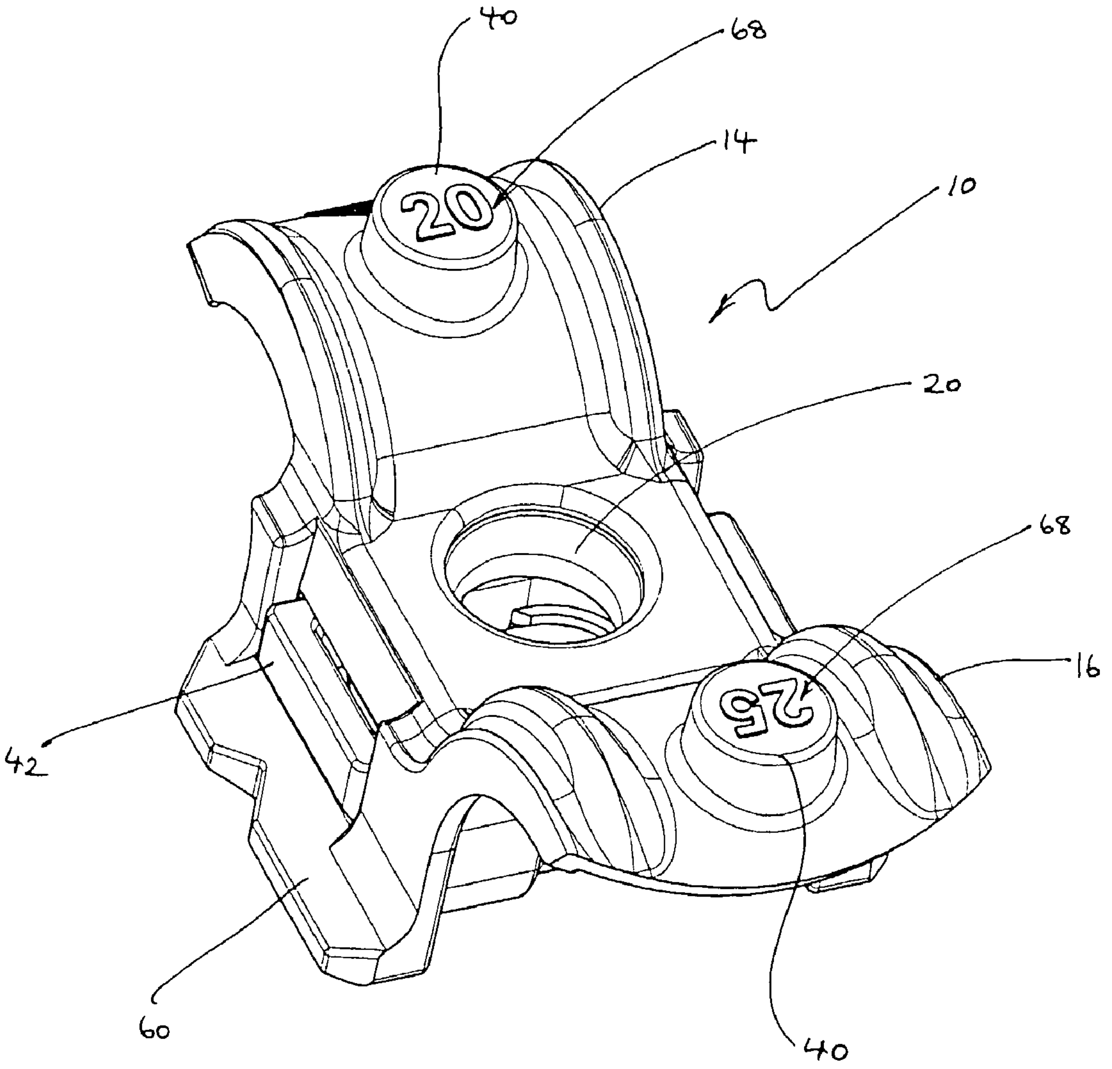
FIG. 14 is a top/end perspective view of the adaptor shown in FIGS. 9 to 13.

An adaptor 10 for a tool 12 having an attachment portion 18 for coupling to the tool 12 is shown in FIG. 1. The attachment portion 18 includes a structure having an aperture 20 which receives a nosepiece 24 of the tool 12. In the particular example of the adaptor 10 shown in the drawings, the aperture 20 is for receiving a nosepiece of a fastening tool 12, as shown in FIG. 8. When the nosepiece 24 is received within the aperture 20 as shown in FIG. 8, fasteners pass through the aperture 20 when they are driven through the nosepiece 24.

The adaptor 10 is able to be engaged in place on the nosepiece 24 of the fastening tool 12 by virtue of the adaptor 10 having a selectively operable lock 22. The lock 22 cooperates with a groove in the nosepiece 24 to positively locate the adaptor 10 in place on the nosepiece 24.

In the example shown, the adaptor 10 is configured to carry an article in the form of a work piece, and more particularly a mounting bracket 26 with which the fastening tool 12 is arranged to operate.

The adaptor 10 shown also includes a first support 14 on one side of the attachment portion 18, and a second, larger, support 16 on the opposite side of the attachment portion 18. By being arranged in this way, the adaptor 10 is able to assist in positioning of a mounting bracket 26 relative to the tool 12. Each of the supports 14, 16 is provided with a magnetic member 28 for attracting a mounting bracket 26 so that the mounting bracket 26 is able to be carried by the adaptor 10. Such attraction of the mounting bracket 26 to the adaptor 10 serves to retain the mounting bracket 26 in place on the adaptor so that the mounting bracket 26 is able to be carried and located in place by manipulation of the adaptor 10 itself, or by manipulation of the fastening tool 12 to which the adaptor 10 is coupled.

More particularly, the adaptor 10 has a body 32 including the attachment portion 18 and the lock 22, and the pair of supports 14, 16 which extend outwardly from opposite ends of the body 32. Each of the supports 14, 16 is in the form of a curved arm 34, 36, each of the two arms having a different radius of curvature to enable contact between the arm 34, 36 and curved holding portions 38 of different mounting brackets 26. In the adaptor 10 shown in the representations, the first support 14 has a radius of curvature suitable such that the first support 14 is able to contact the curved holding portion 38 of a 20 mm diameter saddle type mounting bracket **26*a* (see FIG. 2), and the second support 16 has a radius of curvature to enable contact between the second support 16 and the curved holding portion 38 of a 25 mm diameter saddle type mounting bracket 26*b* (see FIG. 2 and FIG. 3). As such, a single adaptor 10 is provided which can be used with two common sizes of mounting bracket 26**.

Figure 2:
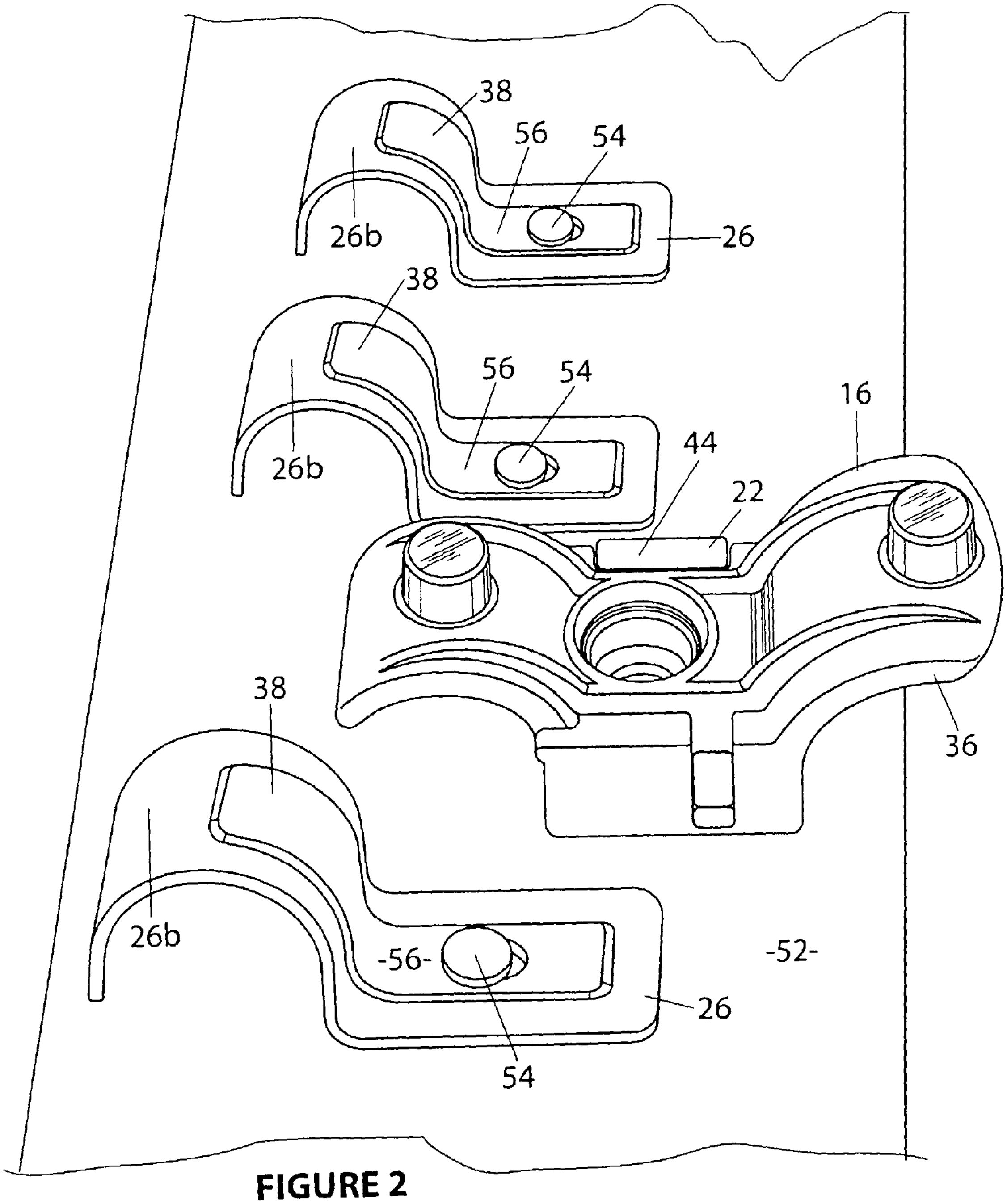
FIG. 2 is a perspective view of a first side of the adaptor shown in FIG. 1, together with various mounting brackets shown secured to a piece of wood.

FIG. 2 shows a side perspective view of a first side of the adaptor 10 of FIG. 1, and clearly shows the second support 16 as having a greater radius of curvature than the first support 14. This photograph also shows bulges 40 on the top surfaces of the supports 14, 16 which bulges house the magnetic members 28. In this Figure the lock 22 is in an engaged condition, as evident by the protrusion of button 42 from the body 32. Button 42 is pushed inwardly to move the lock 22 to its disengaged condition, which condition is evident by the protrusion from the body 32 of opposite button 44 (see FIG. 6). Positive engagement of the lock 22 in engaged and disengaged conditions is achieved by virtue of the sprung point 46 (see FIGS. 1, 6 and 7) and the corresponding two indentations 48, 50 in the body 32 which receive the sprung point 46, and correspond to the engaged condition and disengaged condition, respectively.

Figure 4:
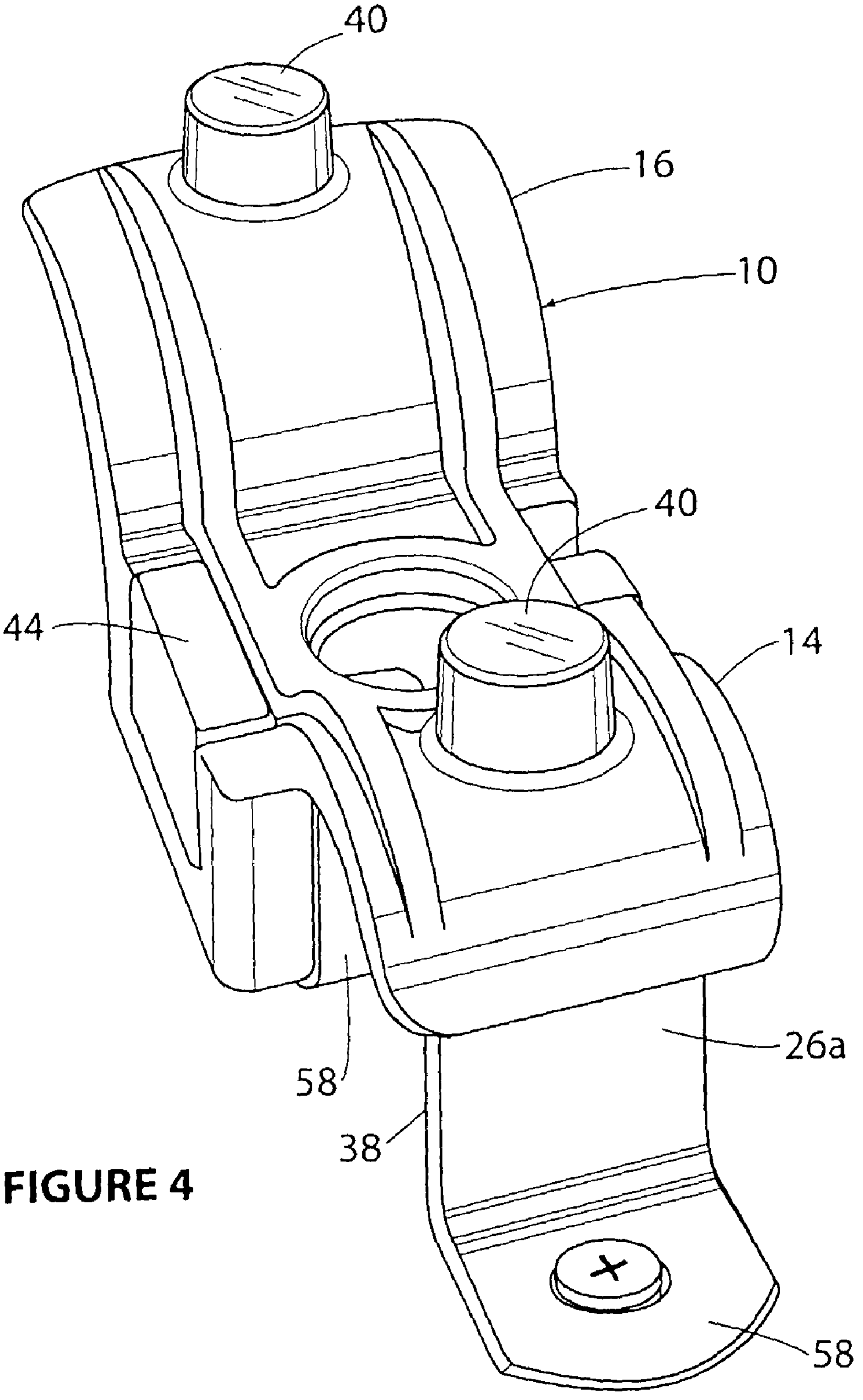
FIG. 4 is an end perspective view of the adaptor shown in FIGS. 1 to 3, the adaptor shown as being coupled to a full-saddle type mounting bracket.

Also shown in FIG. 2 are several mounting brackets 26, **26*a*, 26*b* shown as being secured to a substrate in the form of a piece of wood 52 by fasteners 54. The mounting brackets 26, 26*a*, 26*b* are all either of the "half-saddle" type, wherein the mounting bracket comprises a curved holding portion 38 with an integrally formed substantially planar mounting portion 56 at only one side of the holding portion 38, or are of the "full-saddle" type (see FIG. 4) which comprises a curved holding portion 38 with a substantially planar mounting portion 58 at either side of the holding portion 38**.

Figure 3:
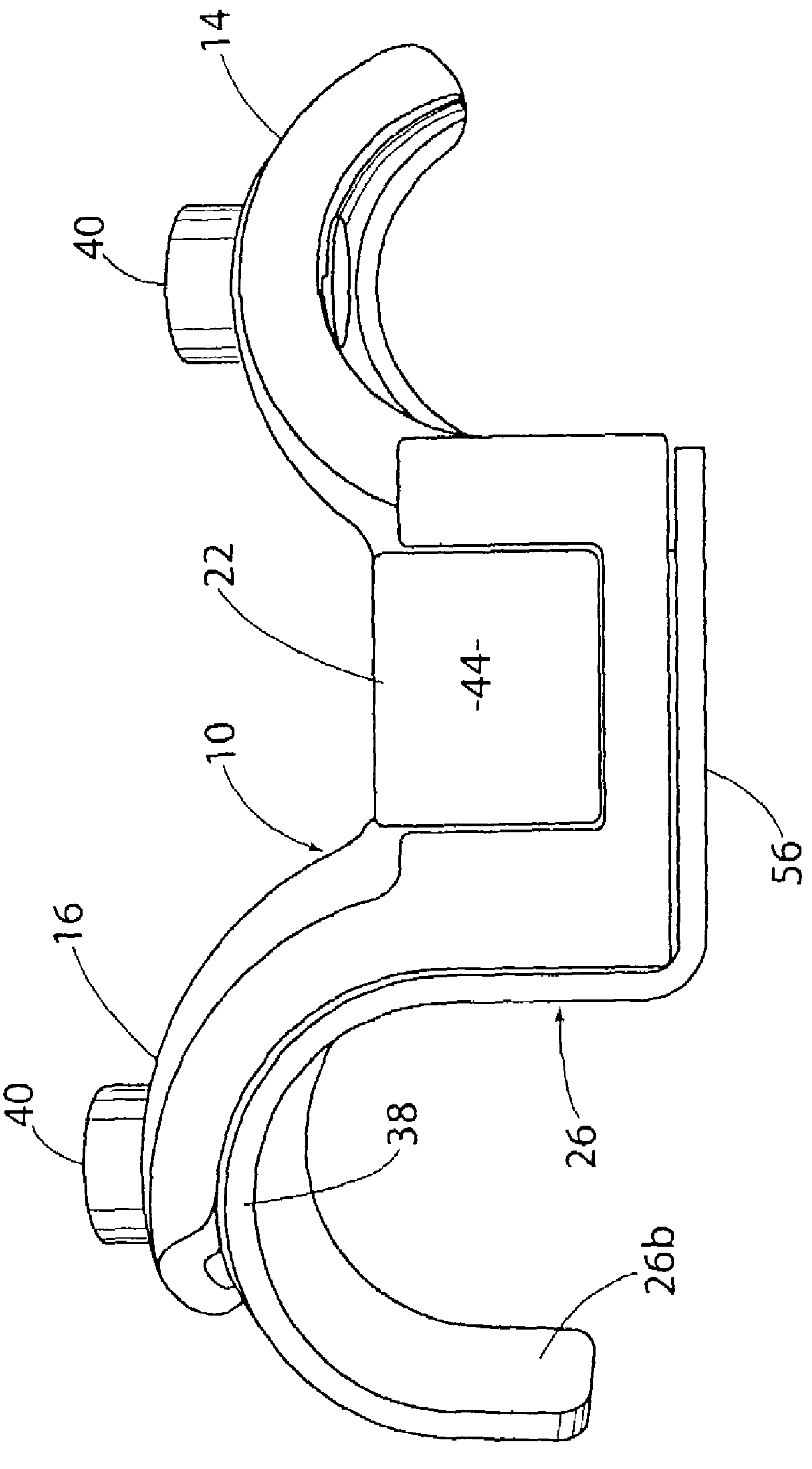
FIG. 3 is a side view of a second side of the adaptor shown in FIGS. 1 and 2, the adaptor shown as being coupled to a half-saddle type mounting bracket.

The curved holding portions 38 of the mounting brackets 26, 26*a*, 26*b* shown in the representations are for holding conduits housing one or more wires relative to a substrate. More particularly, the one or more wires are contained in a conduit and the curved holding portion 38 of the mounting bracket 26 is shaped to correspond with the shape of an outside surface of the conduit so that, when the mounting bracket 26 is fastened to the substrate, the curved holding portion 38 extends at least partially around the outside surface of the conduit to hold the conduit to the substrate. In one particular form, the conduit is in the form of cylindrical PVC piping and the curved holding portion 38 of the mounting bracket 26 is correspondingly curved to contact with the outside surface of the PVC piping. In turn, as shown in FIG. 3 which depicts the adaptor 10 when coupled to a mounting bracket of the "half-saddle" type, the profile of the second support 16 closely corresponds to the profile of the curved holding portion 38.

Figure 5:
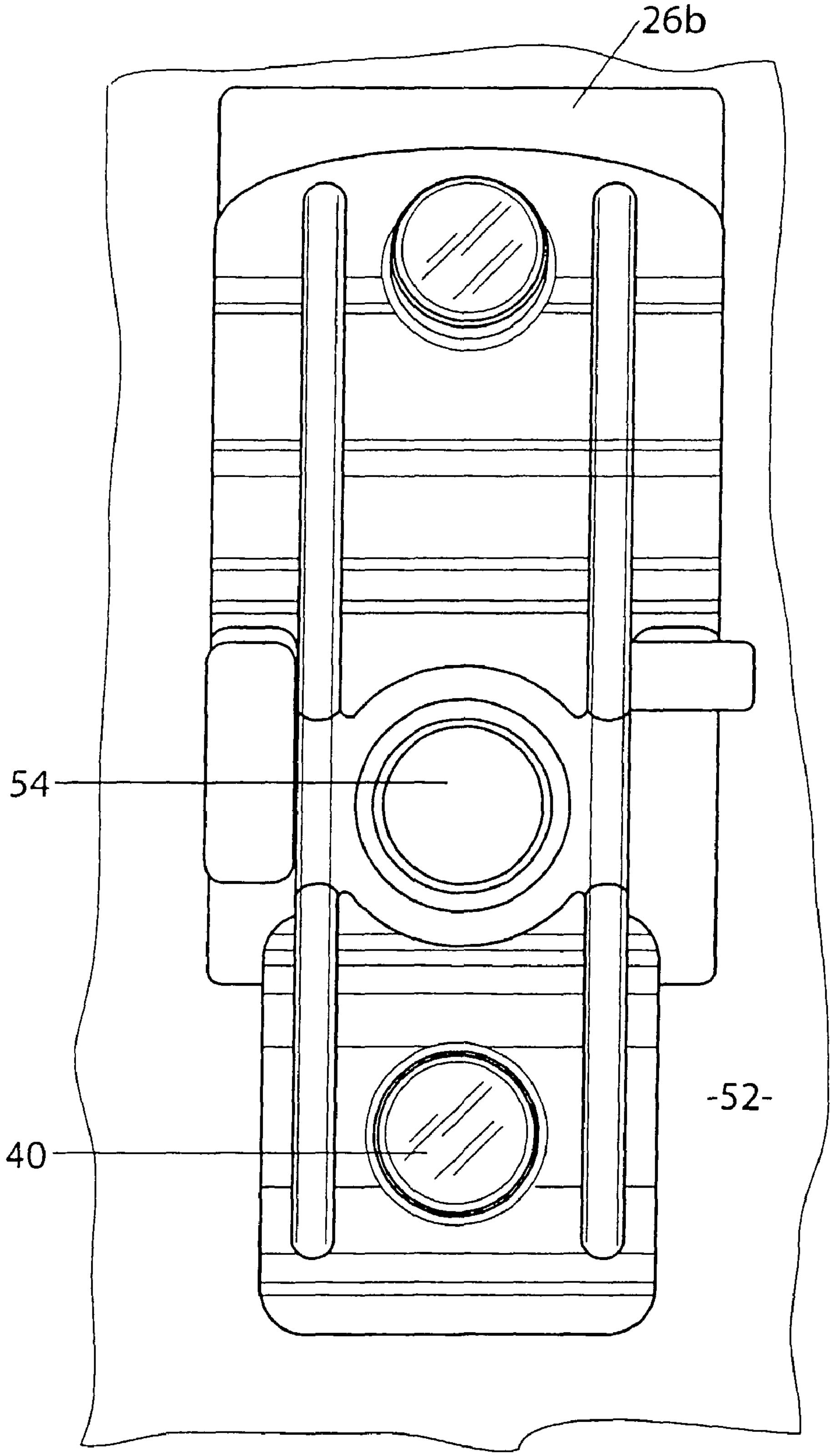
FIG. 5 is a top view of the adaptor shown in FIGS. 1 to 4, the adaptor shown as being coupled to a half-saddle type mounting bracket.

Although mounting brackets of the types shown commonly have a pre-formed aperture in the mounting portion 56, 58, it is also possible for there to be no pre-formed aperture and instead for the aperture to be formed in the mounting portion by the fastener as it is driven through the mounting bracket and into the substrate. As seen from the top view of FIG. 5, when the 25 mm mounting bracket 26*b* is coupled to the adaptor 10, by virtue of the relative placement of the second support 16 and the aperture 20, the aperture 20 is aligned with the location on the mounting portion at which the fastener is to be driven through the mounting bracket and into the substrate, whether that be at the pre-formed aperture or at the location at which the aperture is to be formed by the fastener 54. In the case of FIG. 5, the fastener 54 has already been driven through the mounting bracket 26*b* and into the piece of wood 52. Similarly, when a 20 mm mounting bracket 26*a* is coupled to the adaptor 10, by virtue of the relative placement of the first support 14 and the aperture 20, the aperture 20 is aligned with the location on the mounting portion at which the fastener is to be driven through the mounting bracket 26*a*.

The mounting bracket 26 is secured to the substrate 52 by coupling the adaptor 10 to the fastening tool 12 as shown in FIG. 8. Although the adaptor 10 depicted is removably coupled to the fastening tool 12, it is foreseen that an alternative adaptor may be integrally formed on the nosepiece of the fastening tool. Returning to the arrangement shown in FIG. 8, the adaptor 10 is fitted to the nosepiece 24 of the tool 12 by inserting the nosepiece 24 through the aperture 20 of the adaptor 10 with the lock 22 in its disengaged condition, and by operating the lock 22 by way of button 44 so as to engage the lock 22 with an annular groove formed around the periphery of the nosepiece 24. The mounting bracket 26 is then coupled to adaptor 10 with the curved portion 38 of the mounting bracket 26 in contact with the appropriate one of the supports 14, 16, and with the mounting portion 56, 58 of the mounting bracket 26 under the body 32 of the adaptor 10. If necessary, the tool 12 is then moved so that the mounting bracket 26 is supported in position relative to the substrate 52, with the holding portion 38 of the mounting bracket 26 extending about a conduit to be secured to the substrate, and the tool 12 is operated so as to drive a fastener through the mounting portion 56,58 of the mounting bracket 26 to secure the mounting bracket 26 to the substrate 52.

Figure 6:
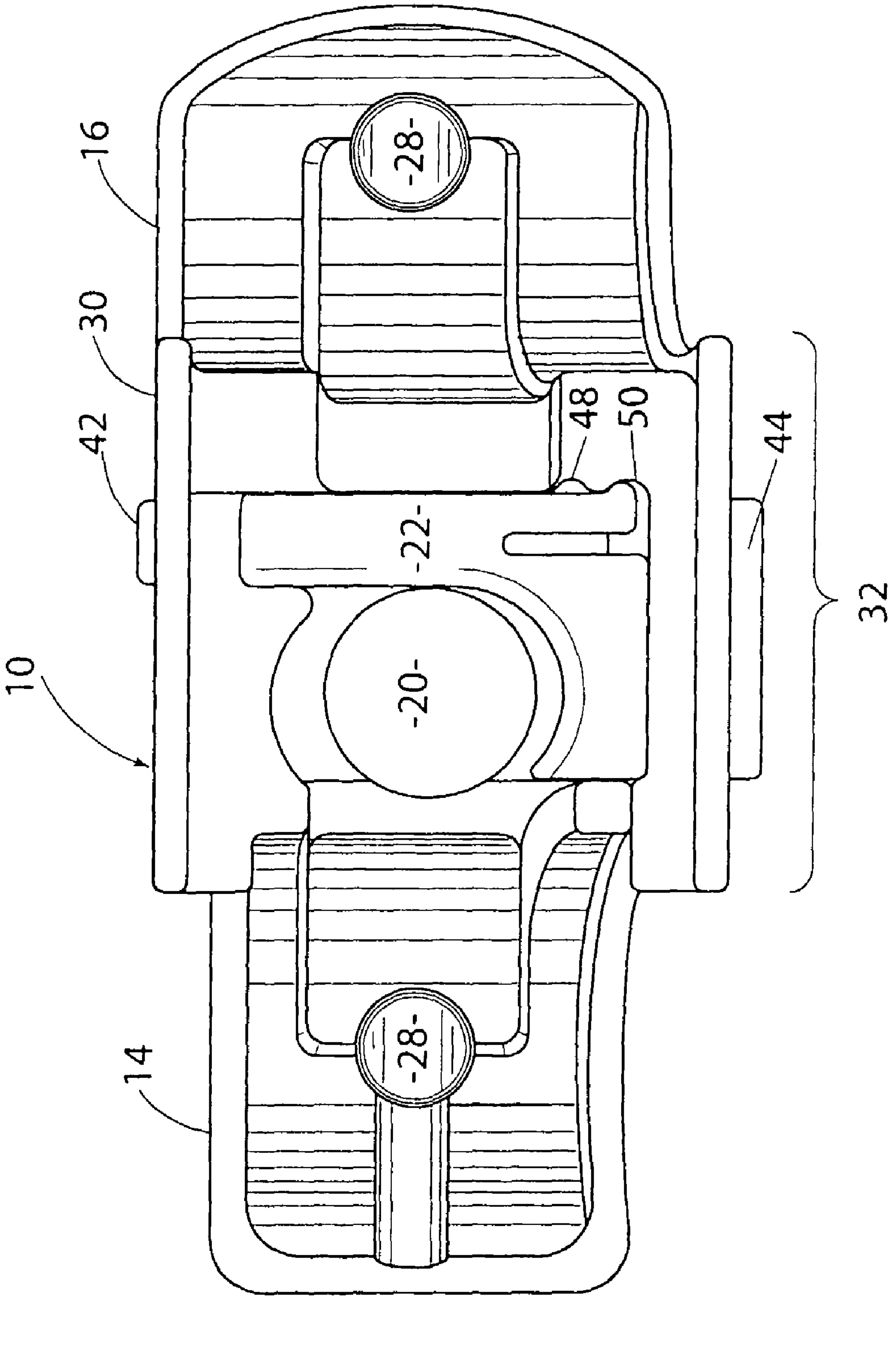
FIG. 6 is a bottom view of the adaptor shown in FIGS. 1 to 5, a lock of the adaptor being shown in a disengaged condition.
Figure 7:
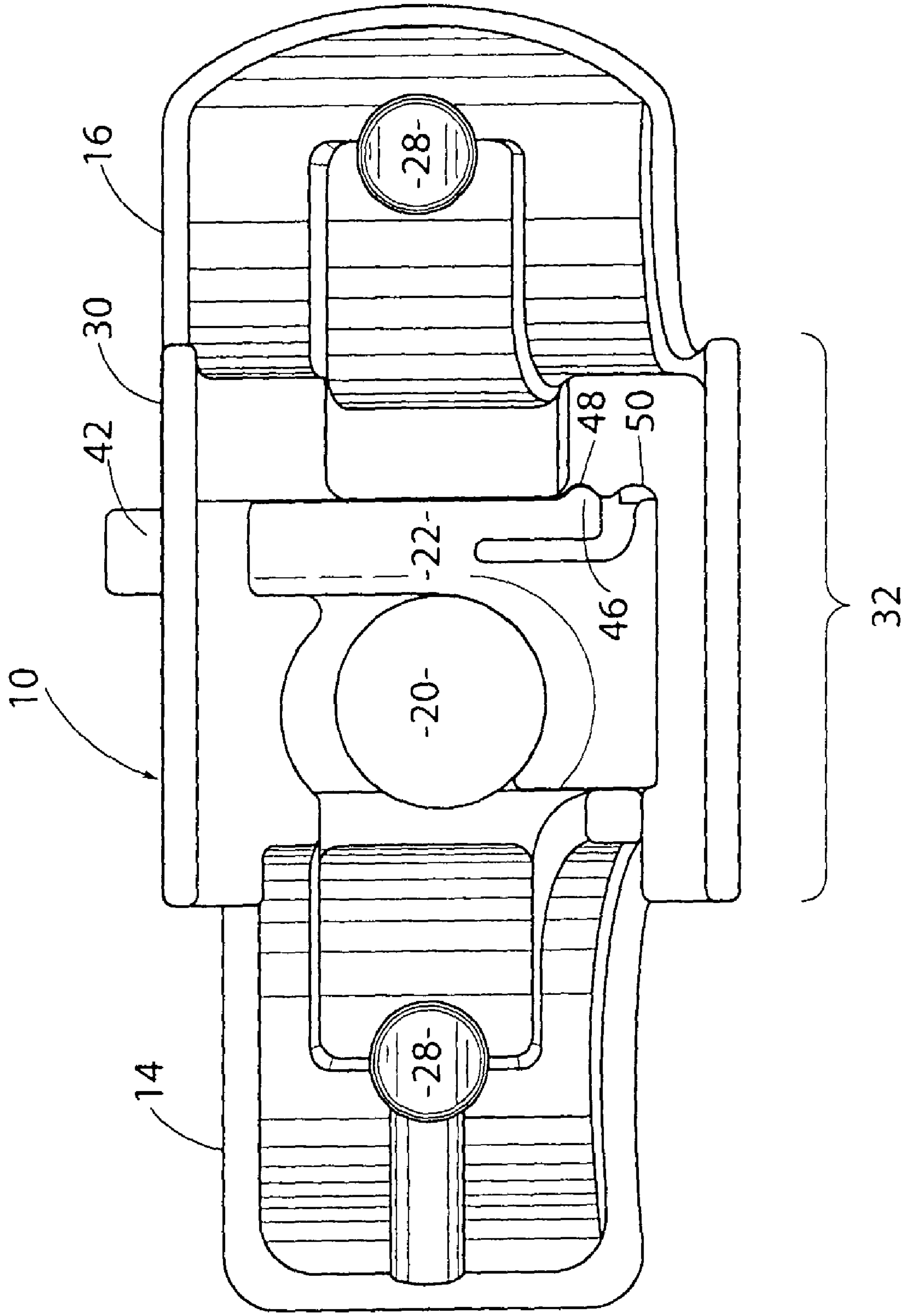
FIG. 7 is a bottom view of the adaptor shown in FIGS. 1 to 6, the lock of the adaptor being shown in an engaged condition.

FIGS. 6 and 7 show bottom views of the adaptor 10, with the lock in disengaged and engaged conditions, respectively.

Where the mounting bracket 26 is in the form of a full-saddle having a mounting portion 58 at either end of a curved holding portion 38, after operating the tool so as to drive a first fastener through one mounting portion 58 of the mounting bracket 26, the adaptor 10 is then pivoted about substantially 180 degrees relative to the mounting bracket 26 so as to align the tool 12 for driving a second fastener through the other mounting portion 58 of the full-saddle type mounting bracket 26. The tool 12 is then operated to drive the second fastener through that other mounting portion 58 to further secure the mounting bracket 26 to the substrate 52.

Advantageously, by use of the adaptor as described above, the mounting bracket 26 is able to be secured efficiently to the substrate to hold a conduit to the substrate without manually holding the mounting bracket in position relative to the substrate during fastening, thus removing or at least reducing the danger of injury from a fastener being accidentally driven into a user's hand.

FIGS. 9 to 14 show an alternative adaptor 10*a*, which is similar in general configuration and operation to the adaptor 10 shown in FIGS. 1 to 8. Accordingly, features of the adaptor 10*a* of FIGS. 9 to 14 which are alike features of the adaptor 10 of FIGS. 1 to 8 are indicated with like reference numerals.

One difference of the adaptor 10*a* of FIGS. 9 to 14 when compared to the adaptor 10 of FIGS. 1 to 8 is that the body 32 has laterally-protruding feet 60 on either side which assist in achieving stable abutment of the adaptor 10*a* against a mounting bracket 26 before and during fastening of the mounting bracket to a substrate 52. The laterally-protruding feet are also provided with indicators in the form of indentations 62 which are aligned with a centre of the aperture 20 to assist a user in correctly aligning the adaptor 10*a* and mounting bracket 26 relative to the substrate 52 so as to ensure a correct fastened position of the mounting bracket on the substrate 52.

The feet 60 are also marked with dimensioned indicators 64 which give the relative distances of the centre of the aperture 20 to relevant reference positions 66. In the example shown, the reference positions 66 are the centres of the saddles of the mounting bracket, and the dimensioned indicators 64 are labelled "21" and "31" at either end of the body 32 to correspond with the distance in millimetres of the centre of the aperture 20 relative to the centre of the respective saddle.

A further difference of the adaptor 10*a* of FIGS. 9 to 14 is that the bulges 40 on the top surfaces of the supports 14, 16 which house the magnetic members 28 are marked with dimensions 68 corresponding to the diameter of mounting bracket 26 for which the respective supports 14, 16 are sized. Accordingly, as can be seen with reference to FIG. 12, one support 14 is sized for use with a 20 mm diameter saddle type mounting bracket and the other support 16 is sized for use with a 25 mm diameter saddle type mounting bracket. Other adaptors may be sized for use with other sizes of mounting bracket. In particular, the Applicant foresees a further adaptor having a first support sized for use with a 16 mm diameter saddle type mounting bracket and a second support sized for use with a 32 mm diameter saddle type mounting bracket.

The above adaptors have been described by way of example only and modifications are possible within the scope of the invention. In particular, it is to be understood that the adaptor may be of other kinds, and is not limited to being an adaptor for supporting a mounting bracket.

The claims defining the invention are as follows:

1. An adaptor for a fastening tool, comprising:

an attachment portion for coupling the adaptor to the fastening tool, and a support arrangement for selectively coupling different sized mounting brackets to the adaptor and for holding a selected mounting bracket relative to a substrate and allow a fastener from the tool to be driven through the selected mounting bracket to secure the selected mounting bracket to the substrate, the support comprising a plurality of magnets, one specifically for each of the different sized mounting brackets, each magnet being disposed in a different spaced relationship with respect to an axis along which the fastener is ejected from the tool.

2. An adaptor as claimed in claim 1, wherein the attachment portion is fitted to a nosepiece of the tool.

3. An adaptor as claimed in claim 2, wherein the attachment portion includes an aperture which receives the nosepiece of the tool.

4. An adaptor as claimed in claim 2, wherein the adaptor is provided with a lock for releasably locking the adaptor to the nosepiece of the tool.

5. An adaptor as claimed in claim 4, wherein the lock is selectively operable to engage with an annular groove formed in an outer surface of the nosepiece.

6. An adaptor as claimed in claim 1, wherein the adaptor is arranged to align an aperture of the mounting bracket with a nosepiece bore of the tool.

7. An adaptor as claimed in claim 1, wherein the adaptor has a plurality of said supports.

8. An adaptor as claimed in claim 7, wherein the supports are configured differently so as to be suitable for use with different mounting brackets.

9. An adaptor as claimed in claim 8, wherein the supports are differently sized so as to be suitable for use with differently-sized mounting brackets.

10. An adaptor as claimed in claim 7, wherein the adaptor has a body which includes the attachment portion and the lock, and there are two said supports which extend outwardly from opposite sides of the body, each of the supports being in the form of a curved arm having a different radius of curvature to enable contact between one of the arms and associated differently shaped mounting brackets.

11. An adaptor as claimed in claim 1, wherein the adaptor includes at least one indicator substantially aligned with a centre of the fastener to assist a user in correctly aligning the adaptor and mounting bracket relative to the substrate.

12. An adaptor as claimed in claim 1, wherein the first and second magnets are respectively mounted on first and second asymmetrically configured support features and are configured to attract and hold first and second different sized mounting brackets thereto.

13. An adaptor as claimed in claim 1, wherein the first and second magnets are housed in first and second bulges which respectively extends above each of the first and second asymmetrically configured support features.

14. An adaptor as claimed in claim 13, wherein the first and second asymmetrically configured support features are convexly curved wing-like features which extend diametrically away from each other.

15. An adaptor as claimed in claim 1, wherein the tops of the bulges are marked with a size of the mounting bracket which the support feature is configured to support.

16. An adaptor as claimed in claim 1, wherein the first and second different sized mounting brackets are shaped and configured to hold different sized conduits on the substrate.

17. A holder for holding a selected one of a plurality of different sized items to facilitate attachment of said selected item to a substrate by a fastener, wherein the holder magnetically retains the selected item in a position to receive the fastener from a fastener tool, the holder comprising a plurality of support features which each have a magnet disposed therewith, the plurality of support features being configured so that only one selected item can be magnetically retained on the holder at one time.

18. A holder as claimed in claim 17, wherein the holder is adapted to be mounted on a nosepiece of the tool.

19. A holder as claimed in claim 18, wherein the holder includes a structure to engage with the nosepiece.

20. A holder as claimed in claim 19, wherein the structure has an aperture which receives the nosepiece.

21. A holder as claimed in claim 18, wherein the holder is provided with a lock for releasably locking the holder to the nosepiece.

22. An holder as claimed in claim 21, wherein the lock is selectively operable to engage with an annular groove formed in an outer surface of the nosepiece.

23. A holder as claimed in claim 17, wherein each magnet is arranged in a different spatial relationship with respect to an axis along which the fastener is inserted into the substrate.

* * * * *